United States Patent [19]
Licht et al.

[11] Patent Number: 5,553,782
[45] Date of Patent: Sep. 10, 1996

[54] EXPANDABLE DIAPHRAGM FOR SCRUBBER ATOMIZER CAPS

[75] Inventors: Morten Licht, Canton; George B. Watson, Alliance; Robert B. Myers, Norton; Dennis W. Johnson, Barberton, all of Ohio

[73] Assignee: The Babcock & Wilcox Company, New Orleans, La.

[21] Appl. No.: 334,504

[22] Filed: Nov. 4, 1994

[51] Int. Cl.⁶ .................................................. B05B 15/02
[52] U.S. Cl. .......................... 239/107; 239/112; 239/120; 239/602
[58] Field of Search .................... 239/104, 106, 239/1, 112, 120, 548, 602, 107

[56] References Cited

U.S. PATENT DOCUMENTS

| | | | |
|---|---|---|---|
| 2,953,248 | 9/1960 | Troland | 239/107 |
| 4,385,727 | 5/1986 | Spencer | 239/107 |

FOREIGN PATENT DOCUMENTS

| | | | |
|---|---|---|---|
| 1445641 | 12/1988 | U.S.S.R. | 239/107 |
| 00254 | 1/1995 | WIPO | 239/102.1 |

*Primary Examiner*—Andres Kashnikow
*Assistant Examiner*—Lisa Douglas
*Attorney, Agent, or Firm*—Daniel S. Kalka; Robert J. Edwards

[57] ABSTRACT

An improved atomizer removes deposits from the end cap. The atomizer housing carries a flow of atomizing slurry. A spraying head is connected at one end of the housing and an end cap is connected to the spraying head. A plurality of exit orifices are provided in the end cap for discharging atomized slurry into a flue gas. A connecting ring is detachably engaged with the end cap and has a elastomeric diaphragm for covering an outer surface of the end cap. Energizing fluid is provided through the sprayer head and end cap for expanding the diaphragm away from the end cap surface for releasing particles which adhere to the diaphragm.

12 Claims, 4 Drawing Sheets

EXPANDABLE DIAPHRAGM FOR SCRUBBER ATOMIZER CAPS

BACKGROUND OF THE INVENTION

1. Field of the Invention

The present invention relates, in general, to the desulfurization of flue gas and, in particular, to a new and useful atomizer cap for a dry scrubber reactor which utilizes an expandable diaphragm.

2. Description of the Related Art

Dry flue gas desulfurization systems such as dry scrubber reactors (DSR's) operate by atomizing an aqueous sorbent (slurry or solution or solids containing fluid) into a reaction chamber containing hot flue gas, where sulfur dioxide ($SO_2$) in the flue gas reacts with the sorbent and dries into a powder. Similar systems such as humidification systems are used to atomize water which contains small amounts of suspended or dissolved solids into a flue gas. The primary methods for atomizing the fluid employ either rotary atomizers or dual-fluid atomizers. One known dual-fluid atomizer is sold by Babcock & Wilcox under the trademark Durajet™ which is a dual-fluid type atomizer which has replaced the maintenance-intensive rotary atomizers in some applications.

Dual-fluid atomizer jets entrain surrounding gas that contains a portion of the atomized fluid. The entrained gas flow subsequently establishes a recirculation zone near the atomizer with regions of reverse gas flow. This reverse flow causes fluid droplets to impinge onto the exterior surface of the atomizer end cap. This wetting of the atomizer is known as spray-back. As the water evaporates from the wet atomizer, deposits are formed. If not removed, deposition continues until interference occurs with the atomized jets discharged through the exit orifices, which degrades and deteriorates atomizer performance.

The aircraft industry has used inflatable bladders on critical surfaces of wings for shedding the build-up of ice while in flight.

Presently, the spray-back condition is alleviated by supplying shield air as an annular flow around the atomizer. The shield air is aimed at preventing droplets in the recirculating flow from impinging on the atomizer. Testing of known atomizers with water and air as the working fluids has shown that the shield air helps to minimize spray-back onto the end cap, but does not prevent end cap wetting downstream of the exit orifices of the atomizer. Moreover, high shield air flow rates can distort the spray pattern, further wetting the end cap, which leads to greater deposit growth in an operating DSR system.

SUMMARY OF THE INVENTION

The present invention is an atomizer for a flue gas desulfurization reactor comprising an atomizer housing which carries flows of atomizing air and slurry. A spraying head is connected to the housing at one end of the housing. An end cap is connected to the spraying head of the housing. A plurality of exit orifices are provided in the end cap for discharging atomized slurry into a hot flue gas. A flexible diaphragm is detachably engaged to the outer surface of the end cap by a connecting ring.

The flexible diaphragm is made of a flexible elastomeric material such as rubber, neoprene, latex, viton or the like. Energizing fluid such as air is provided through the end cap to the flexible diaphragm for expanding the diaphragm between its relaxed position and an expanded position for shedding any particles which had adhered to the outer surface of the flexible diaphragm.

The connecting ring has a plurality of grooves at its inner circumference; and the end cap has a plurality of grooves thereon shaped to receive the grooves of the connecting ring so that the ring can be secured onto the end cap.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of a known atomizer;

FIG. 2 is a sectional view of an atomizer according to the present invention having a flexible diaphragm in a covering position;

FIG. 3 is a view of FIG. 2 illustrating the flexible diaphragm in an expanded position;

FIG. 4 is a perspective view of a connecting ring of FIG. 2;

FIG. 5 is a partial perspective view of the end cap of FIG. 2; and

FIG. 6 is a frontal view of another embodiment of the present invention.

DESCRIPTION OF THE PREFERRED EMBODIMENTS

FIG. 1 shows a known atomizer for use for example as a dry flue gas desulfurization system for atomizing an aqueous sorbent slurry, or solution of fluid containing solids. The atomizer, generally designated 5, comprises an inner barrel 32 disposed within an outer barrel 30 and a mixing chamber 36 communicating with the outer barrel 30 and the inner barrel 32 for mixing of fluid or sorbent provided through the barrels 30 and 32 respectively. A spraying head 18 connected at one end of atomizer housing 5 is used for directing the fluid through exit orifices 24 by securing head 18 to flange 20 of outer barrel 30 through screws 22. An end cap 14 is connected to the spraying head 18 at the one end such that the plurality of exit orifices 24 are provided through the end cap 14. Exit orifices 24 lead to the mixing chamber 36 for allowing the fluid to be sprayed through the exit orifices 24 at the end cap 14. The purpose of streamlining the flow of shield air as it flows along the outer surface of the atomizer is to prevent "spray-back" of the spray liquid slurry onto the atomizer 5.

The same reference numerals are used to designate the same or similar features for the present invention.

The present invention is aimed at removing deposits from the end cap 14 of the atomizer 5. FIG. 2 illustrates the end cap 14 having a connecting ring 12 detachably engageable with the end cap 14. The connecting ring 12 is preferably a metal ring having a flexible diaphragm 10 covering the entire area bounded by the ring 12. The connecting ring 12 is connected over the outer surface of the end cap 14 such that the flexible diaphragm 10 covers a substantial portion of the outer surface of the end cap 14 below the exit orifices 24. Thus, any deposits which form on the end cap 14 below the exit orifices 24, due to spray-back effects, are adhered to the flexible diaphragm 10 covering the end cap 14.

Figure 4:
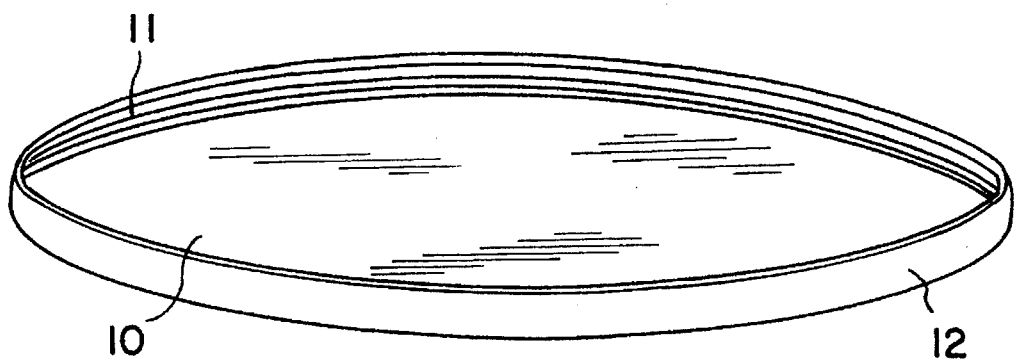
Figure 5:
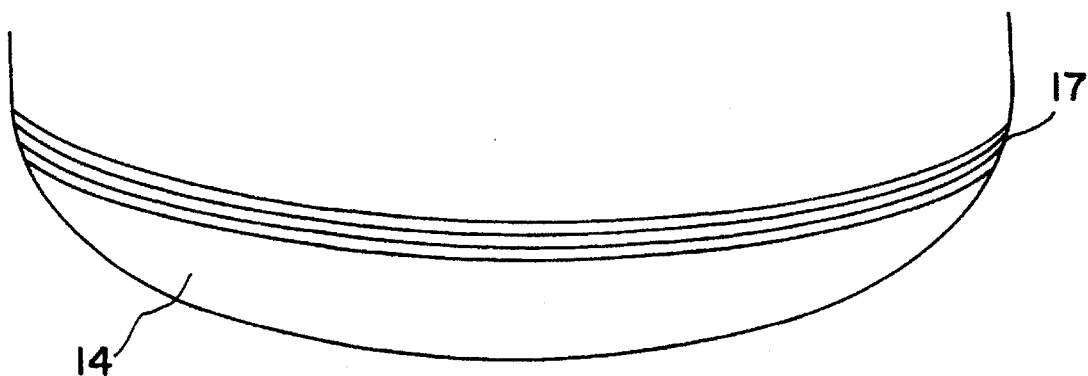

FIG. 4 shows the connecting ring 12 having a plurality of grooves 11 at the inner circumference of the ring 12. A plurality of grooves 17 on the outer surface of end cap 14, as illustrated in FIG. 5, are shaped to receive the grooves 11 of the ring 12 so that the connecting ring 12 is detachably engageable with the end cap 14. The arrangement illustrated in FIGS. 4 and 5 allow for the connecting ring 12 to be screwed onto the end cap 14.

Although FIGS. 4 and 5 illustrate one means for securing the connecting ring 12 to end cap 14, this is just one example of a means for detachably engaging the connecting ring 12 to the end cap 14 and any other suitable connecting means may be used.

Figure 6:
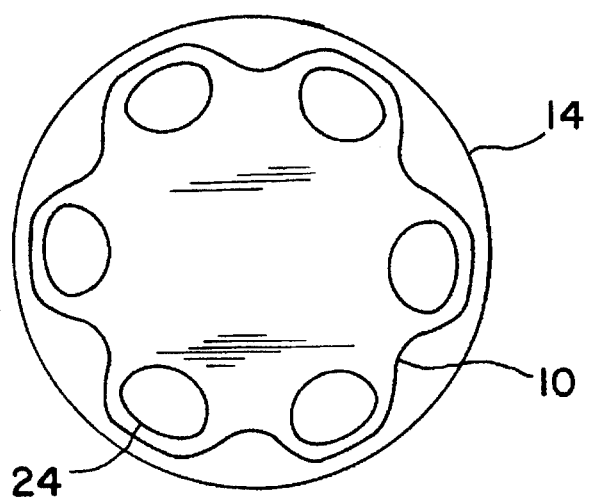

FIG. 6 illustrates another embodiment of the present invention where the flexible diaphragm also surrounds the exit orifices 24 to remove deposition thereon as well.

Figure 1:
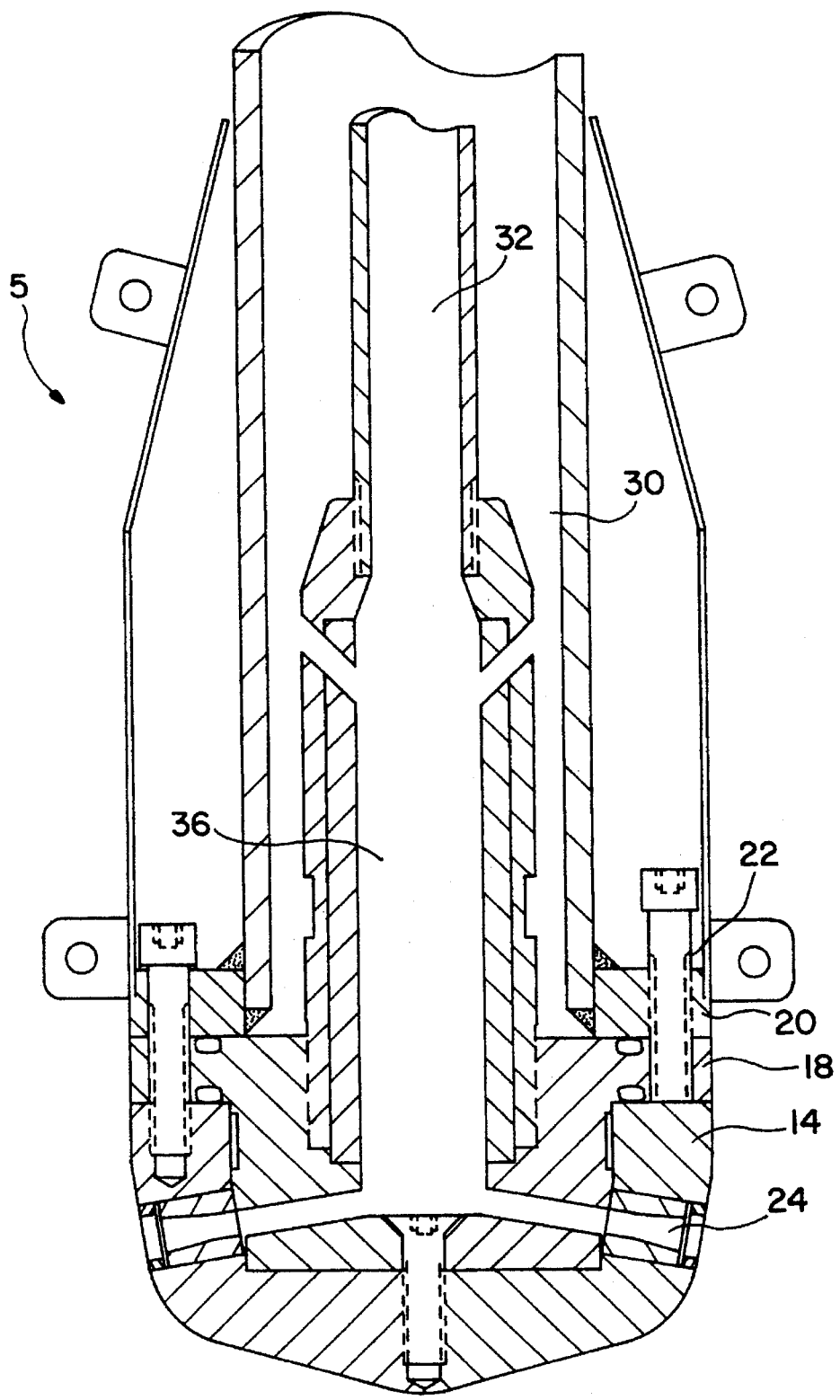
Figure 2:
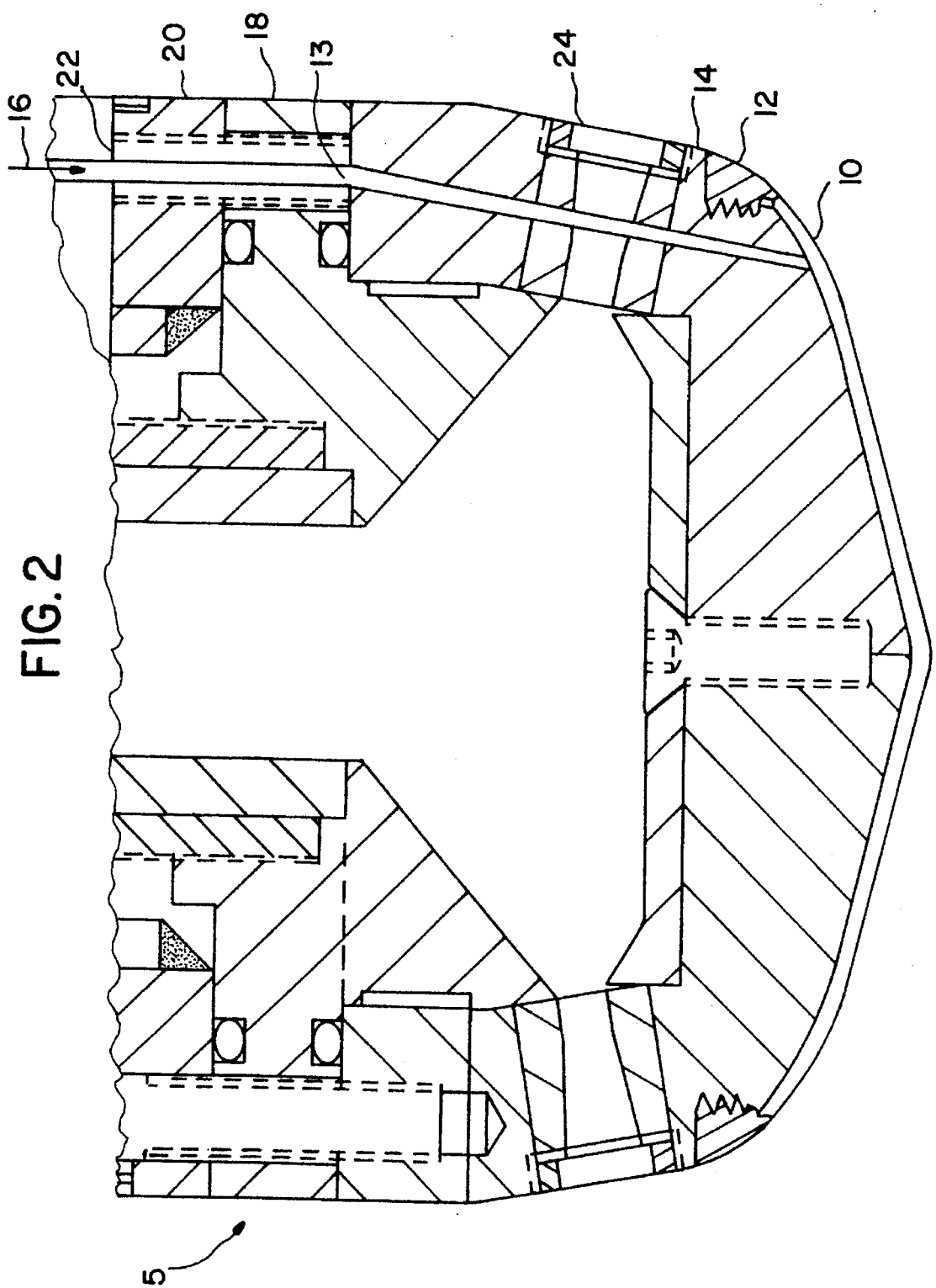

Diaphragm 10 is made of a flexible or expandable material such as rubber, neoprene, fluoroelastomers, etc. FIG. 2 shows the flexible diaphragm 10 in a covering position over the cap 14 which receives any deposits which adhere to the outer surface of diaphragm 10 where the shield air is unreachable and ineffective.

Figure 3:
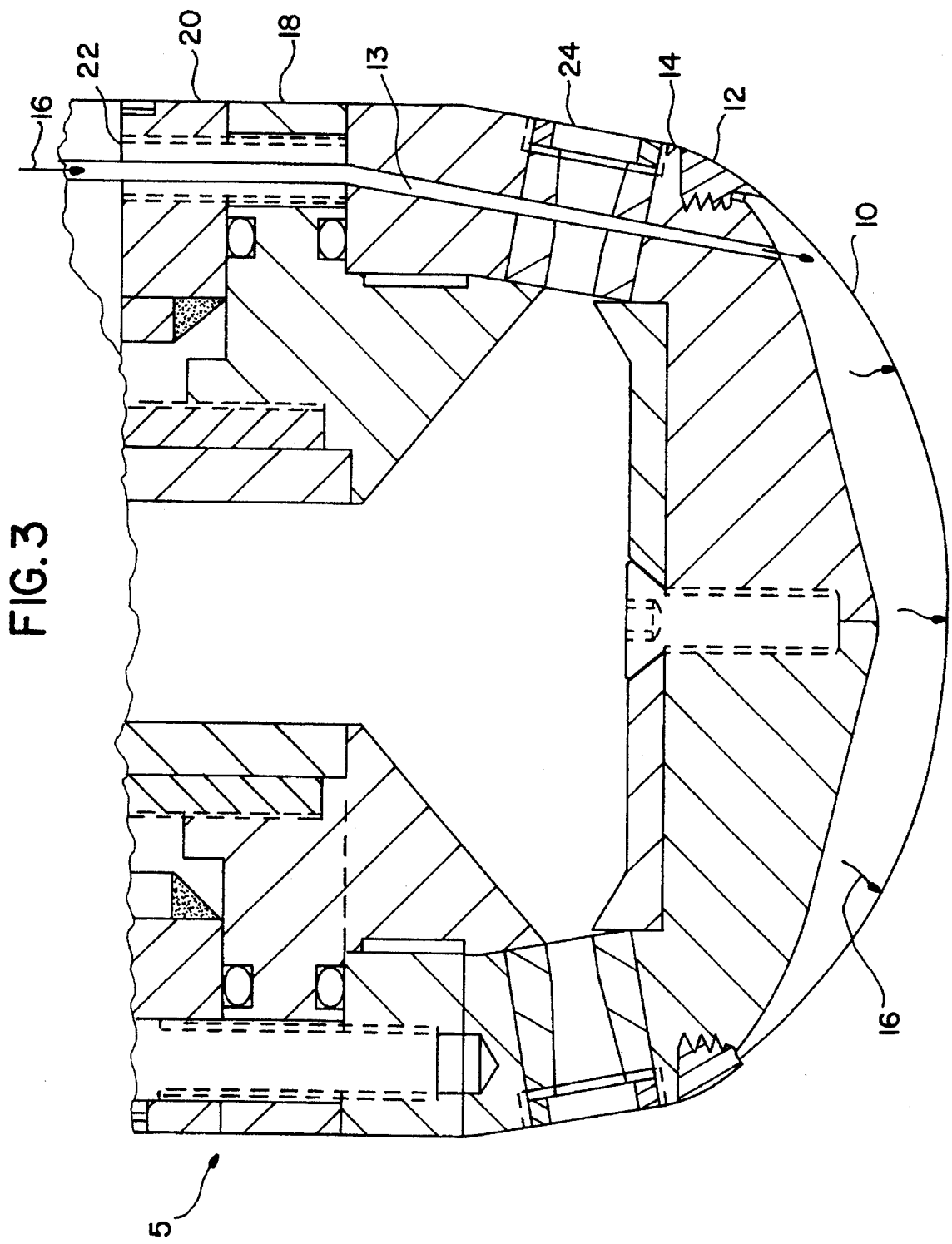

A conduit 13 is provided through the outer barrel flange 20, sprayer head 18 and end cap 14 as shown in FIGS. 2 and 3. Air conduit 13 leads directly to the flexible diaphragm 10 for providing energizing fluid 16 to the flexible diaphragm 10. The energizing fluid 16 passes between the cap screws 22 and the exit orifices 24.

When air 16 is provided through conduit 13 through the spraying head 18 and end cap 14 to the diaphragm 10, the energizing air 16 is forced against the flexible diaphragm 10 causing it to expand outwardly from the end cap 14 as illustrated in FIG. 3. The air 16 forced between the outer surface of end cap 14 and the inner surface of the flexible diaphragm 10, causes the flexible diaphragm 10 to be moved to an expanded position which distorts the shape of the diaphragm 10 which causes any deposits adhered to the outer surface of the diaphragm 10 to be broken free therefrom.

Once the deposits have been broken free from the outer surface of diaphragm 10, the energizing fluid 16 is ceased and the diaphragm 10 resumes its original shape by returning to the covering position covering the outer surface of end cap 14.

The present invention modifies the known atomizer designs, which provides several advantages such as providing an efficient method for removing deposits.

Also, the atomizer does not have to be removed from service to remove deposits thus having minimal effect on the overall desulfurization process.

The diaphragm of the present invention can be remotely controlled, or automatically operated, thereby reducing maintenance costs. The present invention also minimizes the amount of shield air required to prevent droplet impingement.

While specific embodiments of the invention have been shown and described in detail to illustrate the application of the principles of the invention, it will be understood that the invention may be embodied otherwise without departing from such principles.

What is claimed is:

1. An improved atomizer, comprising:

a housing;

means for channeling a fluid containing solids through the housing;

a spraying head attached to one end of the housing and constructed to receive the fluid containing solids and directing the fluid containing solids from the housing;

an end cap connected to the spraying head of the housing, the end cap having an outer surface that receives deposits from the fluid containing solids which adhere thereto;

expandable means provided on the outer surface of the end cap for being expanded between a relaxed position and an expanded position for removing the deposits from the end cap; and means for expanding the expandable means between the relaxed position and the expanded position, the means for expanding the expandable means including means for channeling fluid through the end cap to the expandable means.

2. The atomizer according to claim 1, wherein the expandable means comprises a connecting ring detachably engageable with the end cap, the connecting ring having an area and an elastomeric material connected to the connecting ring over the area of the connecting ring.

3. The atomizer according to claim 2, wherein the elastomeric material is rubber.

4. The atomizer according to claim 1, wherein the fluid containing solids is a solution.

5. The atomizer according to claim 1, wherein the fluid containing solids is a slurry.

6. The atomizer according to claim 2, wherein the connecting ring has a plurality of grooves at an inner circumference of the connecting ring for detachably engaging the groove means of the end cap.

7. The atomizer according to claim 2, wherein the elastomeric material is neoprene.

8. The atomizer according to claim 2, wherein the elastomeric material is latex.

9. The atomizer according to claim 2, wherein the elastomeric material is a fluoroelastomer.

10. The atomizer according to claim 2, wherein the end cap has groove means therein for receiving the connecting ring.

11. A method for removing deposits from an end cap of an atomizer, the method comprising the steps of:

providing an atomizer having spraying means and an end cap with expansion means attached to an outer surface of the end cap below the spraying means and covering at least a portion of the end cap;

receiving deposits from a fluid containing solids on the outer surface of the end cap of the atomizer, the deposits adhering to the outer surface of the end cap; and periodically expanding the expansion means outwardly from the end cap for removing the deposits adhered to the end cap of the atomizer.

12. The method according to claim 11, including the step of expanding the expansion means by forcing a fluid into the expansion means of the end cap.

* * * * *